US008660520B2

(12) United States Patent
Felt et al.

(10) Patent No.: US 8,660,520 B2
(45) Date of Patent: Feb. 25, 2014

(54) EMERGENCY NOTIFICATION SYSTEM FOR DEVICES WITHIN A TARGETED BOUNDARY

(75) Inventors: Michelle Felt, Randolph, NJ (US); Brian Roberts, Frisco, TX (US); Don Relyea, Dallas, TX (US); Heath Stallings, Colleyville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 477 days.

(21) Appl. No.: 12/164,846

(22) Filed: Jun. 30, 2008

(65) Prior Publication Data

US 2009/0325535 A1    Dec. 31, 2009

(51) Int. Cl.
*H04M 9/00*    (2006.01)

(52) U.S. Cl.
USPC ............... 455/404.2; 455/412.2; 455/414.3; 455/457; 455/566; 370/235; 370/270; 340/949; 340/905

(58) Field of Classification Search
USPC .......................................... 455/404.1–404.2
See application file for complete search history.

(56) References Cited

U.S. PATENT DOCUMENTS

| | | | | |
|---|---|---|---|---|
| 5,946,605 A * | 8/1999 | Takahisa et al. | ................ | 455/68 |
| 6,459,695 B1 * | 10/2002 | Schmitt | .......................... | 370/344 |
| 6,828,922 B1 * | 12/2004 | Gremmert et al. | ............ | 340/949 |
| 7,031,714 B1 * | 4/2006 | Rayburn | ........................ | 455/445 |
| 7,177,623 B2 * | 2/2007 | Baldwin | ..................... | 455/404.2 |
| 2007/0192588 A1 * | 8/2007 | Roskind et al. | ................ | 713/155 |
| 2009/0007271 A1 * | 1/2009 | Huang et al. | ..................... | 726/26 |
| 2009/0170468 A1 * | 7/2009 | Kane et al. | ................. | 455/404.2 |
| 2009/0224942 A1 * | 9/2009 | Goudy et al. | ................. | 340/905 |
| 2009/0247125 A1 * | 10/2009 | Grant | ............................ | 455/411 |
| 2009/0318110 A1 * | 12/2009 | Zarefoss | .................... | 455/404.2 |
| 2009/0325538 A1 * | 12/2009 | Sennett et al. | ............. | 455/404.2 |

* cited by examiner

*Primary Examiner* — Anthony Addy
*Assistant Examiner* — Keith Fang

(57) ABSTRACT

An emergency shepherd service includes at least one communications facility configured to provide communication services to at least one communication device in a service area and a notification subsystem including at least one processor and a computer readable medium with instructions. The instructions may be configured to cause the processor to receive information relevant to an affected area and identify at least one communication facility associated with the affected area based on a predetermined knowledge of a site of the communication facility. The instructions may be further configured to cause the processor to discover at least one communication device associated with the communication facility, determine that the communication device should be notified about the information, and send a message based on the information to the communication device.

18 Claims, 6 Drawing Sheets

EMERGENCY NOTIFICATION SYSTEM FOR DEVICES WITHIN A TARGETED BOUNDARY

BACKGROUND

In the event of an emergency situation, governments and public safety agencies, among others, may attempt to provide information and warnings to affected people. However, it can be difficult to ascertain who should be notified. Typical notification systems provide information to a very wide breadth of people. For example, news agencies might have an audience that spans an entire metropolitan area. The emergency broadcast network similarly reaches a very wide audience due to its broadcast nature. Civil defense sirens may be localized to particular municipalities, but may not be able to provide any information other than the warning siren. All of these mechanisms rely on broadcast technology in an attempt to provide information. The geographic region that receives the broadcast alerts can be significantly larger than the area affected by the emergency situation. Individuals may be less inclined to follow emergency alerts if they are not specifically targeted. Additionally, emergency broadcast systems fail to take advantage of techniques for locating and directing individuals away from an affected area.

DETAILED DESCRIPTION OF THE PREFERRED EMBODIMENTS

Figure 1:
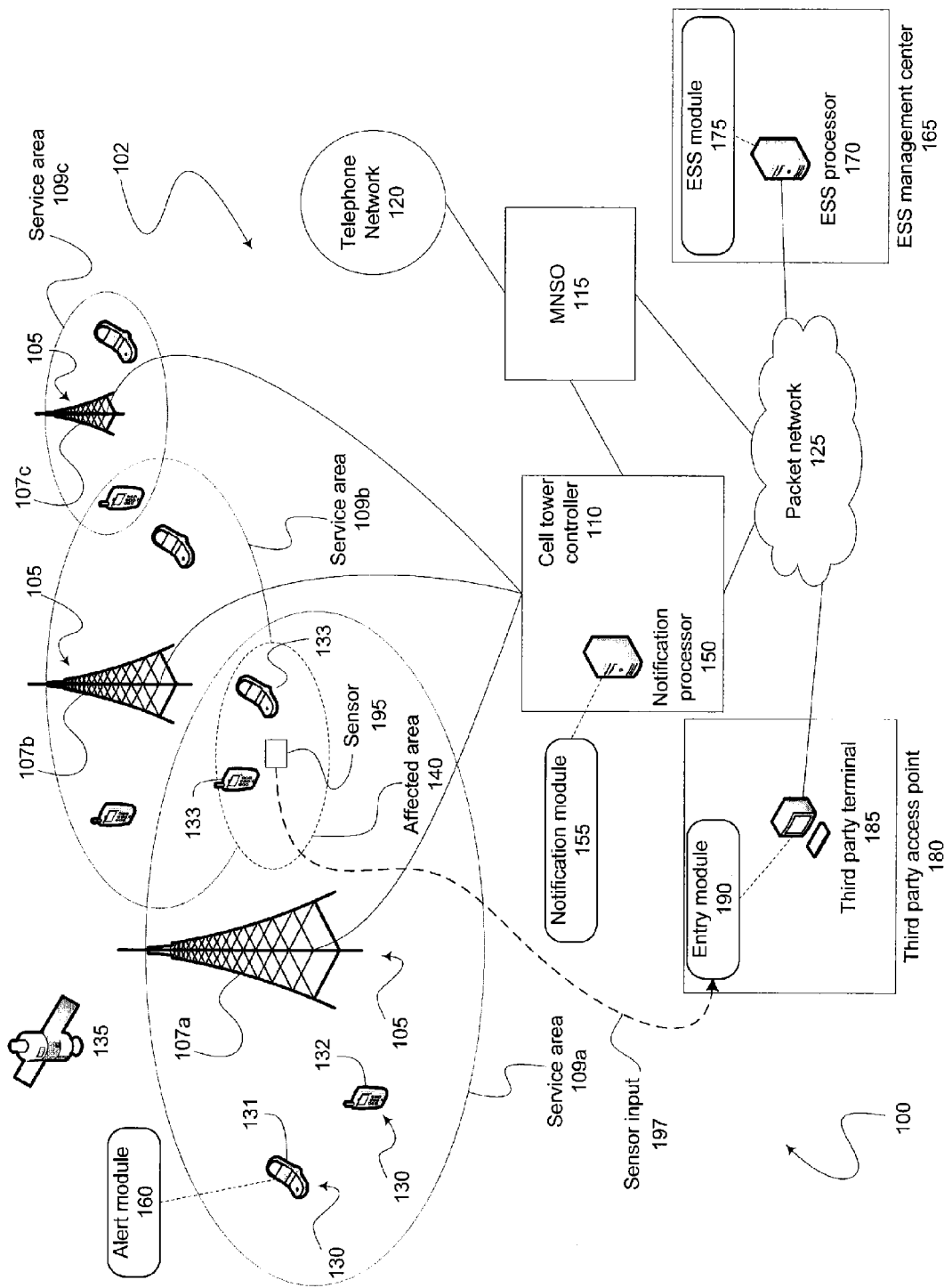
FIG. 1 is a system diagram of an exemplary emergency shepherd service.

Exemplary illustrations of an emergency shepherd service are described below. In the interest of clarity, not all features of an actual implementation are described in this specification. It will of course be appreciated that in the development of any such actual illustration, numerous implementation-specific decisions must be made to achieve the specific goals of the developer, such as compliance with system-related and business-related constraints that will vary from one implementation to another. Moreover, it will be appreciated that such a development effort might be complex and time-consuming, but would nevertheless be a routine undertaking for those having the benefit of this disclosure.

Referring now to the drawings wherein like numerals indicate like or corresponding parts throughout the several views, exemplary illustrations are provided.

FIG. 1 illustrates an exemplary Emergency Shepherd Service (ESS) 100. Details of the elements depicted in the figures are included following a brief functional overview of the ESS 100. The ESS 100 utilizes an existing telecommunications infrastructure to provide targeted information about an emergency situation. The telecommunications infrastructure could include, among others, a wireless systems such as a mobile telecommunications network 102, a computer network such as a Local Area Network (LAN) 205 (FIG. 2), a telephone network (not show), a cable television network (not show), etc. Using a telecommunications infrastructure in which the locations of communication devices can be determined may allow messages to be sent to only those communication devices that are likely to be affected by the emergency situation. Accordingly, emergency alerts may be more effective due to being targeted and not overly broad.

An area affected by an emergency situation may be identified by a boundary based on input from sensors and third-party input. Once identified, the telecommunications infrastructure may be used to discover communication devices that should be notified about the affected area. For example, the ESS 100 could be configured to notify only those devices within the affected area, those devices in the affected area as well as those adjacent to a periphery of the affected area, those devices heading toward the affected area, etc. Messages including alerts about the affected area may be sent directly to the discovered devices in a targeted manner. The message may also include directional assistance based on the current location of the device to assist the operator with leaving or avoiding the affected area.

A mobile telecommunications network 102 may include a plurality of communication facilities 105 such as cell towers 107*a-c*. The cell towers 107*a-c* may be controlled by a cell tower controller 110. The cell tower controller 110 may include connections to a Mobile Network Switching Office (MNSO) 115, a telephone network 120, and a packet switched network 125. The mobile telecommunications network 102 may provide communication services to a plurality of communication devices 130, e.g. mobile phones 131, smart phones 132, and any other device configured to communicate with the communications facilities 105.

Cell towers 107*a-c* may include one or more radio receivers and transmitters to communicate with communication devices 130 within range. The range of the cell towers 107*a-c* may be defined as service areas 109*a-c*. The service areas 109*a-c* are depicted with a uniform shape merely for simplicity of illustration. The actual service areas 109*a-c* are likely to be irregular due to interferences and topography. Additionally, the receivers and transmitters of the cell towers 107*a-c* may be arranged in a directional manner, e.g., a set of three groups of receivers and transmitters with each group covering 180 degrees. A network operator may also add additional receivers or transmitters to cover specific, irregular areas that, for what ever reason, do not receive service from cell towers 107*a-c*. The communication facilities 105, e.g., cell towers 107*a-c*, are positioned at fixed locations which are known and recorded by the network operator. The service areas 107*a-c* of the communication facilities 105 are also tracked by the network operators in order to accurately portray the extent of the mobile communication network 102, as well as to avoid redundant placement of facilities.

One or more cell towers 107*a-c* may be controlled by a cell tower controller 110. The cell tower controller 110 typically includes communication processing equipment (not show) to control the wireless communication between a particular tower 107*a* and a communication device 130. The controller 110 may also handle the hand-off of the communication between the communication device 130 and the tower 107*a* to another tower 107*b* as the device moves from one service area 109*a* to the next 109*b*. The cell tower controller 110 may also include wired or optical network connections to a mobile network switching office (MNSO) 115. The MNSO 115 typically includes telephone switching equipment (not show) to route call traffic between other MNSOs 115 and cell tower controllers 110 and may also interface with a telephone network 120, e.g., a public switched telephone network. Some mobile communication networks 102 may combine the functionality of the cell tower controller 110 and the MNSO 115.

The cell tower controller 110 may maintain records of the communication devices 130 within the service areas 109a-c of the cell towers 107a-c. For example, the records may include attributes related to the communication device 130 and the contact therewith, e.g., an identifier of the device 130, the time of last contact, the signal strength, the direction of the signal, the time difference between the time the signal was sent and the time it was received, etc. These attributes may be used by the cell tower controller 110 to determine which cell tower 107a-c should best handle the communication with the device 130. For example, the signal strength or time difference may be used to determine that the communication device 130 should be handed off to another cell tower 107a-c, and perhaps transferred to another cell tower controller 110 (only one shown).

Both the MNSO 115 and the cell tower controller 110 may connect to a packet network 125 to send and receive packet based data communications. For example, the packet network 125 may be used to transmit commands and data, including voice communication data, e.g., Voice Over Internet Protocol (VOIP), to the MNSO 115 and the cell tower controller 110. The packet network 125 may be a packet switched communication network such as an Internet Protocol (IP) network. The packet network 125 generally interconnects various computing devices and the like through a common communication protocol, e.g. the Internet Protocol. Interconnections in and with the packet network 125 may be made by various media including wires, radio frequency transmissions, and optical cables. Other devices connecting to and included with the packet network 125, e.g., switches, routers, etc., are omitted for simplicity of illustration in FIG. 1.

A constellation of satellites 135 (only one shown) may implement a satellite based navigation system, e.g., the Global Positioning System (GPS). Many mobile communication devices 130 include a satellite receiver configured to determine a geographic location based on transmissions received from the satellites 135. For example, the navigation satellite 135 may transmit highly accurate time values and ephemeris data that when compared with the time values and ephemeris data received from other satellites can be used by a mobile communication device 130 to determine its location. The location may then be converted to a latitude and longitude reading in degrees, minutes, and seconds, and may further be depicted graphically on map displayed by the communication device 130.

Due to the power consumption of a satellite navigation receiver and the typically limited battery life of most mobile communication devices 130, the satellite based navigation receiver may be activated for only as long as needed to determine the location of the device 130. For example, the satellite based navigation receiver may be temporarily activated based on input from the operator of the device 130 indicating that the location should be determined. Additionally, the cell tower controller 110, or other components of the communication network 102, may instruct the communication device 130 to determine its location. Some governmental authorities mandate that mobile communication devices 130 that have satellite based navigation receivers be able to report their location without the assistance or input of the operator in the case of emergency calls, e.g., 911 calls. The cell tower controller 110 may additionally receive and record the location of the mobile communication device 130. Location may be stored or logged for a period of time.

The above-described mobile telecommunication network 102 may be supplemented with additional components to create the Emergency Shepherd Service (ESS) 100. The ESS 100 may provide a notification subsystem to the telecommunications network 102. The ESS 100 may be able to discover and send directed messages to at risk communication devices 130a in an affected area 140. The cell tower controller 110 may be augmented with a notification processor 150 and a notification module 155. The notification module 155 may be configured to send messages about the affected area 140 to an alert module 160 operating on a mobile communication device 130.

The notification processor 150 represents general processing capabilities that may be provided by a general purpose computer server or personal compute (PC), as well as by a specialized embedded system. Moreover, the notification processor 150 may be any computer system capable of operating the instructions provided by the notification module 155. The role of the notification processor 150 may be filled by the existing equipment of the cell tower controller 110 rather then be provided by a separate element. For example, the notification module 155 may operate directly on the cell tower controller 110 equipment. Similarly, the notification processor 150 and the notification module 155 need not be co-located with the cell tower controller 110 so long as they can cooperate with the cell tower controller 110 to discover communication devices 130 within the service areas 109a-c of the cell towers 107a-c.

The notification module 155 may include instructions for discovering communication devices 130 associated with the cell towers 107a-c. The association of the communication devices 130 with the cell towers 107a-c may be based on GPS mechanisms as noted above comparing locations of the towers with the known location of the affected communication devices. Alternatively, the association of the communication devices 130 may be based on communicative contact with cell towers 107a-c therewith. As discussed above, the cell tower controller 110 may maintain records or logs of the communication devices 130 that have been in communicative contact with the cell towers 107a-c. The notification module 155 may include instructions for reviewing the logs and records of the cell tower controller 110 to discover the communication devices 130. The attributes in the records maintained by the cell tower controller 110 may further be used to determine the location of a communication device 130. Specific locating techniques will be discussed below, but in general, the location of the device 130 may be based on the known locations of the communication facilities 105, e.g., the cell towers 107a-c. Accordingly, the notification module 155 may access the records of the cell tower controller 110 to determine the location of a set of communication devices 130 in communicative contact with the cell towers 107a-c and may then narrow the set to the at risk devices 130a that should be notified about an affected area 140.

In one exemplary approach, the location of a particular communication device 130 is determined to be coextensive with the service area 109a of the cell tower 107a in communicative contact with the device 130. In this approach, the location of the device 130 is not known to a precise degree because the device 130 may be anywhere within the service area 109a. Broadly locating a device anywhere within the service area 109a may be necessary if the device 130 is only in contact with a single cell tower 107a. For example, in remote areas with sparse coverage by the wireless communication network 102, a device may be in contact with only a single tower 107a at any given time. Accordingly, data relating to the communicative contact between the device 130 and other towers 107b-c that is needed to narrow the location may not be available.

In another exemplary approach, the records of contact between a particular device 130 and multiple cell towers 107a-c may be used to determine a more accurate determination of the location of the device 130. Locating techniques recognize that the time it takes a signal sent by a communication device 130 to reach the cell towers 107a-c varies with respect to the distance between the device 130 and towers 107a-c. Accordingly, the cell tower controller 110 may record the time that the same signal reaches each of the towers 107a-c as well as the time that the signal was transmitted from the device 130.

Various techniques such as triangulation, trilateration, multilateration, etc. may be used with the data held in the cell tower controller records to determine the location of the device 130. Trilateration uses the absolute time of arrival as a basis for determining a distance from a particular receiver. The distance is considered a radius of a circle, and when combined with distances (radii) from two other receivers, three partially overlapping circles may be calculated. The location of the transmitting device may be inferred as the point, or area, where the circles intersect. In contrast to trilateration, multilateration determines a location based on the time difference of the arrival time of a signal at multiple cell towers 107a-c rather than the absolute time of arrival. The differences in time are used to calculate overlapping hyperboloids rather than circles, which may be able to determine a location in three dimensions rather than just two. Triangulation may use a known distance between two cell towers 107a-b in combination with an angle of arrival of a signal from the communication device 130. The angle of arrival may be determined if the cell tower 107a includes multiple receivers. The difference in the time it takes a signal to reach each of the receivers may be used to calculate the angle of arrival. Accordingly, these techniques may be used to establish an approximate location of the device 130 based on the collective locations of the communication facilities 105, e.g., the cell towers 107a-c.

Once discovered, the notification module 155 may communicate with the alert module 160 to provide information and alert messages to the communication devices 130a. For simplicity of illustration, only a single communication device 131 is depicted with an alert module 160. However, it is to be understood that many, if not all, of the communication devices 130 associated with the mobile communication network 102 may include the alert module 160. As will be discussed in more detail below with respect to FIG. 3, the alert module 160 may be configured to present a visual and/or audible alert about the affected area 140. The alert message may include directional assistance including at least one route away from the affected area 140.

An ESS management center 165 acts as a control point or hub to the ESS 100. The ESS management center 165 may include an ESS processor 170 and ESS module 175 configured to control the notification of communication devices 130 by the notification module 155. The ESS processor 170 may be a server based computer system, such as a web application server configured to accept input via a web or Hyper Text Transfer Protocol (HTTP) interface. However, any computing device having a computer readable medium including instructions for implementing the ESS module 175 may act as ESS processor 170. ESS processor 170 may be a networked computer system configured with server software for accepting connections via packet network 125. ESS processor 170 may provide an interface of commands via the ESS module 175 for controlling the ESS 100.

The ESS module 175 may provide an interface of remote procedure calls that allow remote systems, e.g., the third party access point 180, to interact with the ESS 100. The ESS module 175 may also provide a graphical user interface (GUI), e.g., a web based interface, for use by a human operator. In one exemplary approach, the operator interface may be used for only initial configurations and exceptional or override states, while the instructions of the management module 175 provide the normal control over the ESS 100. However, in another exemplary approach, a human operator may be involved in the normal control of the ESS 100, e.g., determining the extent or boundary of the affected area 140, determining the content of messages sent to the communication devices 130, etc.

While FIG. 1 only illustrates a single cell tower controller 110 and three associated cell towers 107a-c, the mobile telecommunications network 102 may include numerous cell tower controllers and cell towers. Moreover, an affected area 140 may partially or fully overlap the service areas 109a-c of multiple cell towers 107a-c, which may be associated with different cell tower controllers 110. Accordingly, the ESS module 175 may need to determine which cell towers 107a-c, or communication facilities 105, are associated with affected area 140 in order to discover the communication devices 130 associated with the affected area 140. As discussed above, an operator of the network 102 typically tracks and records the geographic positions of the communication facilities 105 along with boundaries of any applicable service areas, e.g., 109a-c. The identification of affected communication facilities 105, which are associated with the affected area 140, may be based on a correlation between the affected area 140 and the geographic positions of the communication facilities 105.

To discover the communication devices 130 that should be notified, the ESS module 175 may identify affected communication facilities 105, such as cell towers 107a-c, as any communication facility 105 that provides communication services to at least a subset of the affected area 140. The devices 130 that might need to be notified may be discovered from the records of contact with the affected communication facilities 105. This set of devices 130 that might need to be contacted may be reduced to the set of devices that should be contacted based on at least the location of each device 130 with respect to the affected area 140. As will be discussed below, the heading of a device 130 may also factor into the determination of whether the device should be notified about the affected area 140.

In one exemplary approach, the ESS processor 170 and module 175 may be configured to receive information related to the affected area 140 from a third party access point 180. Information about the affected area 140 may include the nature of the emergency situation, the boundary of the affected area 140, the duration of the emergency, suggested emergency routes away from the affected area 140, notification messages about the affected area 140, etc. Rather than relying on the operator of the ESS 100 to be the sole entity responsible for providing information about an affected area 140, the third party access point 180 may provide access to the ESS 100 to any entity that is likely to be aware of information related to an affected area. For example, a governmental or law enforcement agency may operate the third party access point 180. More generally, any entity that may be providing information about the affected area 140 may operate the third party access point 180. Moreover, some information providers may be recognized as competent to provide information relevant to a particular area within the affected area 140, e.g., information about a specific building or structure.

Information from a provider passing through the third party access point 180 may need to be validated. In one exemplary approach, the validation may be based on the identity of the provider of the information. For example, information from governmental or other trusted entities may be automatically validated while information from corporate entities or individuals may require other validation techniques. The ESS 100 may maintain a list or record of authorized information providers, which may be reviewed to determine if a particular provider is an authorized provider. In another exemplary approach, an information provider may not only be authorized, but also may be recognized as the competent information provider for a particular location. In another exemplary approach, the information may be compared to other information that was received from other information providers. Accordingly, the validation may be based on the information being consistent with other information already known.

The third party access point 180 may include a terminal 185 and entry module 190 for providing the information to the ESS management center 165. The entry module 190 may include instructions to communicate with the ESS management module 175 via the packet network 125 using one or more communication protocols. For example, the entry module 190 may include web browsing software to access a web interface provided by the ESS management module 175. The communication between the ESS module 175 and the entry module 190 may implement security procedures, e.g., digital certificates, an authorized users list, a private communication protocol, a private network 125, etc. to protect against fraudulent use.

In one exemplary approach, the ESS module 175 receives the information from the entry module 190 and passes it to the notification module 155 without alteration or modification. However, in another exemplary approach, the ESS module 175 may alter the information received from the entry module 190 before sending it to the notification module 150. While there is only one third party access point 180 illustrated, there may by many third party access points 180 providing information about one or more affected areas 140. Accordingly, the ESS module 175 may aggregate the information about the affected area 140. For example, the ESS module 175 may combine the information to define the boundary of the affected area 140 as the total area identified in the received information. In another exemplary approach, the affected area 140 may be determined to be only the area that is the intersection, or common, to the received information. In another exemplary approach, the information may be weighted for accuracy or reliability prior to determining the boundary affected area 140. Information that is deemed more reliably may have greater influence over the determination of the boundary of the affected area 140.

In one exemplary approach, a sensor 195 such as an emergency sensor may provide sensory input 197 about the affected area 140 to the entry module 190. Exemplary sensors 195 may include weather sensors (wind speed, radar), flood gauges, gun shot detectors, traffic congestion sensors, etc. For each type of sensor, the boundary of the affected area 140 may be determined based on the sensor input 197. For example, the affected area 140 may be determined to include all of the area within a certain radius of the sensor 195. In another exemplary approach, using a flood gauge sensor 195, the topography of the surrounding land may be used along with the sensor input 197 to determine the extent of the affected area 140, e.g. all adjacent land at or below the water level reported in the sensor input 197. In another exemplary approach using a weather radar sensor 195, the track or direction of a storm system may be included with the sensor input 197 and used to determine the boundary of the area 140 that will be affected by the severe weather. Accordingly, the third party access point 180 may include additional information and instructions for interpreting the sensor input 197 in order to provide more meaningful information to the ESS module 175.

The input 197 from multiple sensors 195 (only one shown) may be aggregated to determine the boundary of the affected area 140. In one exemplary approach, multiple gun shot detectors may be used to triangulate the location of a shooting, which could then be used as a center point of the affected area 140. In another exemplary approach, the input 197 from multiple flood gauge sensors 195 could be used to determine the boundary of the area 140 affected by flooding. Also, the input 197 from sensors 195 of different types may be combined to determine the boundary of the affected area 140. For example, a chemical production facility, or the like, may provide chemical sensors 195 along with wind direction and speed sensors 195 to determine the boundary of an area 140 affected by a chemical release.

As bi-directional communication devices, the mobile communication devices 130 may themselves act as sensors 195 that provide sensory input 197 via the mobile communications network 102. In one exemplary approach, the alert module 160 may provide a bi-directional interface allowing the operator to input information about the affected area 140. For example, the operator may be able to report whether he is in or not in the affected area. Input from the mobile communication devices 130 may then be aggregated to alter the size or boundary of the affected area 140. Similarly, input regarding the conditions of the affected area 140 may also be provided. For example, input may indicate whether the conditions of the affected area 140 are worse, better, or consistent with the provided message. Input from operators may be limited to only trusted or credible operators. The trust may be previously established or granted to particular operators, e.g., first responders or other emergency personnel, operators that have received a public safety certification from an authority, etc. In another exemplary approach that does not require predetermined trust, credibility may be determined based the degree of correlation between a given input and the collective input of multiple operators. For example, if enough operators all report similar input, the ESS 100 may accept the input as trustworthy.

In another exemplary approach, the records of the cell tower controller 110 may be used to determine the existence of the affected area 140. The cell tower controller 110 may notice a sudden drop in signals from communication devices 130 which could indicate that the devices or an associated tower 107a were involved in a catastrophic occurrence. Similarly, a sudden increase in call volume from devices that are concentrated or clustered together may indicate the existence of the affected area 140. Moreover, recognizing that the destination or terminating phone number is an emergency response number, e.g., 911, may provide additional evidence of the existence of the affected area 140. Accordingly, the ESS 100 may be able to assist emergency responders in determining the extent of the affected area 140.

Accordingly, the ESS 100 may receive information relevant to an affected area 140 from one or more third party access points 180 and send messages to communication devices 130 using the telecommunications network 102. The information may be provided directly to the entry module 190 by input 197 from a sensor 195. Once received, the ESS module 175 may adjust or alter the boundary of the affected area 140 based on additional input and feedback. The ESS module 175 may then determine which communication facilities 105, e.g., cell towers 107a-c, are associated with the affected area 140 based on a predetermined knowledge of the nature of respective sites of the facilities 105, including geophysical information. The ESS module 175 may then instruct the notification module 155 to discover any communication devices 130 associated with the communication facility 105. The locations of the discovered communications devices 130 may be used to determine which particular devices 130 should be notified about the information. A message based on the information may then be sent to the communication devices 130. The message may include directions including a route away from the affected area 140.

Figure 2:
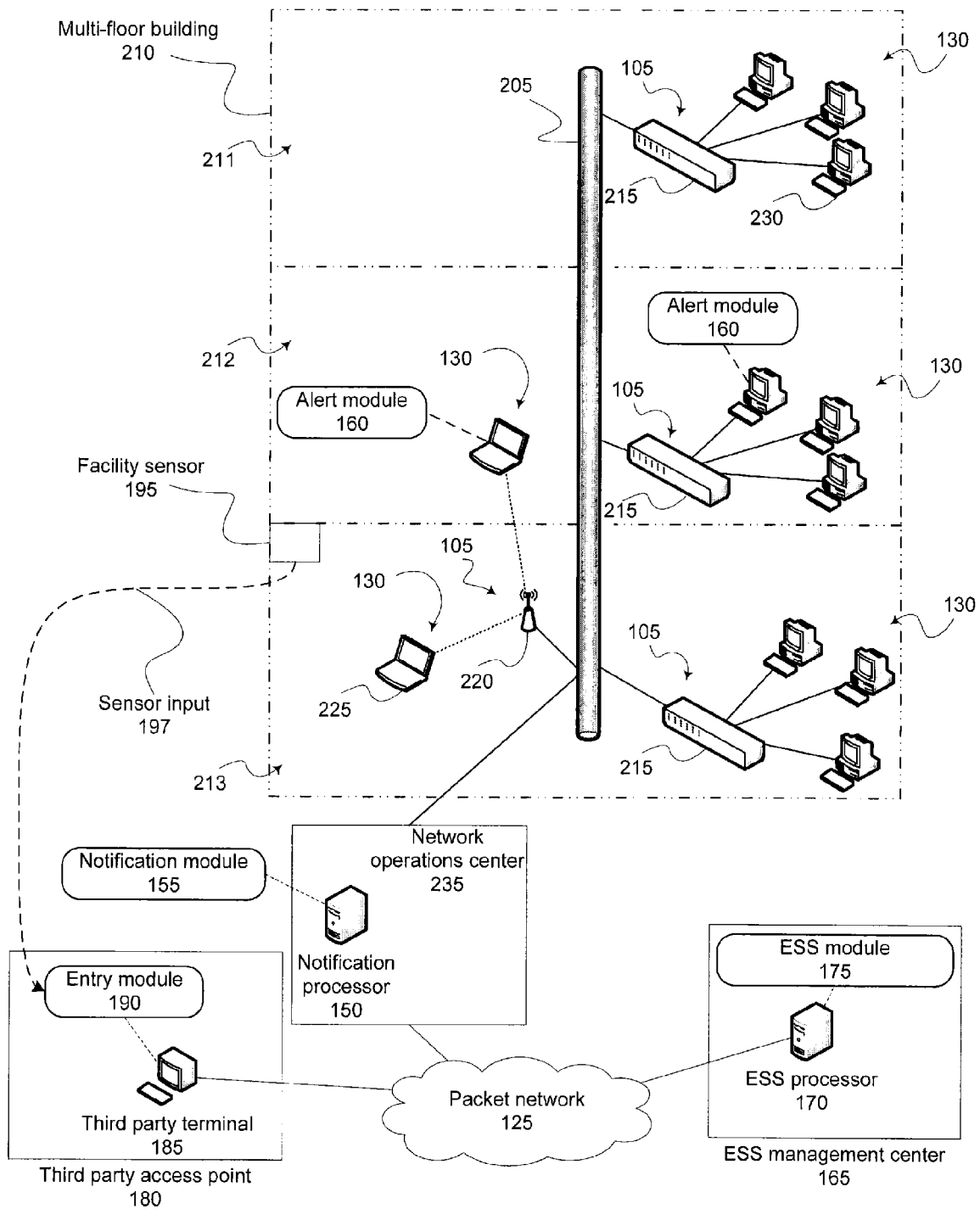
FIG. 2 is a system diagram of another exemplary emergency shepherd service.

FIG. 2 illustrates another exemplary Emergency Shepherd Service (ESS) 200. The ESS 200 may provide the same functionality of the ESS 100 of FIG. 1 and includes some of the same elements discussed above with respect to FIG. 1. However, rather then being implemented with a mobile telecommunications network 102, ESS 200 provides messages using a computer network 205. For example, a structure, such as building 210, which may include multiple floors 211, 212, 213, may provide the network 205 with associated communication facilities 105. The communication facilities 105 of a computer network 205 may include network equipment such as switches 215, wireless access points 220, etc. The communication facilities 105 may connect communication devices 130, e.g., notebook computers 225, PCs 230, etc., to the network 205.

The network 205 and attached communication facilities 105 and devices 130 may be managed by a Network Operation Center 235 (NOC). The NOC 235 may be responsible for positioning the communication facilities 105 throughout the building 210. To that end, the placement details of the communication facilities 105 within the building may be recorded or tracked to facilitate maintenance, replacement, etc. thereof. As discussed above, the ESS 200 may use knowledge of the location of a communication device 130 to provide detailed and targeted messages about affected areas. While some affected areas may encompass the entire building 210, other situations may result in an affected area that only pertains to a subset of the building, e.g., a particular floor 213. The location or placement of a communication device 130, such as the notebooks 225 and PCs 230, may be known directly or determined indirectly based on the location of an associated communication facility 105.

In one exemplary approach, the location of communication devices 130 may be assumed to be within a certain distance of the associated communication facility 105. For example, the particular medium of computer networking technology, e.g., network cables, radio frequency transmissions, etc., may limit the distance that a communication device 105 is placed from an associated communication facility 105. Tracking only the location of the communication facilities may simplify the record keeping because each device 130 does not need to be individually tracked. Additionally, network devices such as switches 215 and wireless access points 220 may move less frequently, if at all. Programmatic discover techniques using networking software, e.g., Simple Network Management Protocol (SNMP) and the like, may be used to determine which devices 130 are in communicative contact with particular communication facilities 105. However in another exemplary approach, the exact placement of a communication device 130 within the building 210 may be tracked. Such an approach may be appropriate if the communication devices 130 are unlikely to move frequently, if at all.

As discussed above, information about an affected area 140 may be provided through a third party access point 180. Additionally, the information may be based on sensory input 197 from a sensor 195. In ESS 200, the sensor 195 may be a sensor located within the building 210, e.g., a smoke detector, carbon monoxide detector, water or flood detector, etc. In one exemplary approach, the sensor 195 may be used to narrow the affected area to only a subset of the building 210, e.g., to a particular floor 213. For example, minor fires may not require the evacuation of the entire building, but only the affected floor, e.g., 212, and potentially any floors above the affected floor, e.g., 211. In one exemplary approach, numerous sensors 195 may be positioned throughout the building 210 in order to provide detailed directions about evacuating or otherwise avoiding an affected area. For example, sensor input 197 may indicate that a particular stairwell is blocked and that another stairwell should be used.

In the context of ESS 200, the third party access point 180 may be operated by the facility manager of the building 210. The facility manager of the building 210 may be best positioned to provide directions out of the building. For example, the facilities manager may have a detailed understanding of the structure of the building 210 as well as any temporary conditions, e.g., renovations, special events, etc., that may effect evacuations of the building 210. In one exemplary approach, the entry module 190 may be programmed with the details of the building to automatically provide as information that will be sent to the ESS module 175. Similarly, the entry module 190 may be configured to programmatically alter the information provided about the facility based on the sensory input 197. The entry module 190 may also be configured to provide different information for communication devices 130 placed at different locations within the building. For example, evacuation directions included with the information may be based on the location of the communication device 130 within the building 210, e.g., devices 130 on the north side of the building may receive directions to use the north stairwell while devices 130 on the south side of the building may receive directions to use the south stairwell.

As discussed above, the ESS module 175 may be configured to aggregate information from a plurality of third party access points 180. For example, information about an affected area that spans multiple buildings 210 (only one shown) may be provided by a third party access point 180 operated by a public safety entity. This first information may include the nature or conditions of the affected area 140 as well as a suggested route away from the affected area. However, the public safety entity may lack the knowledge of a particular building 210 to provide precise evacuation instructions. Accordingly, a second set of information may be provided by the third party access point 180 operated by the facility manager of the building 210 to provide detailed information about evacuating from the building 210. In such an approach, the ESS module 175 may recognize certain third party access points 180 as being competent to provide secondary information that may be relevant to a particular set of communication devices 130 positioned within the building 210. Accordingly, when formulating the message that will be sent to communication devices 130, the ESS module 175 may use the location of the devices 130 to determine if there are any third party access points 180 that may be competent to provide supplemental or secondary information that should be included with the message. In one exemplary approach, if no secondary information has been received by a competent third party access point 180, the ESS module may prompt or request that secondary information be sent for inclusion with the message.

Accordingly, just as the ESS 100 of FIG. 1 may send targeted messages to communication devices 130 using the mobile communication network 102, the ESS 200 may send targeted messages to communication devices 130 in a building 210 using the computer network 205. A facilities manager operating a third party access point 180 may be competent to provide information, which may be secondary or supplemental information, about an affected area including directions out of the building 210. The directions out of the building 210 may be based on the particular location of the communication devices 130 within the building 210. Hybrid implementations may combine the aspects of ESS 100 and ESS 200. For example, mobile communication devices 130, such as cell phones 131 (FIG. 1), may be present within the building 210. The supplemental information provided by the third party access point 180 operated by the facility manager of the building 180 may be provided to the alert module 160 operating on the cell phone 131. As discussed above, the ESS module 175 may recognize a third party access point 180 as competent to provide information relevant to a particular location. Accordingly, any communication device 130, e.g., PC 230, cell phone 131, etc., may receive the supplemental information based on the location of the device 130 being associated or proximate to the location for which the third party access point 180 is competent to provide supplemental information.

Figure 3:
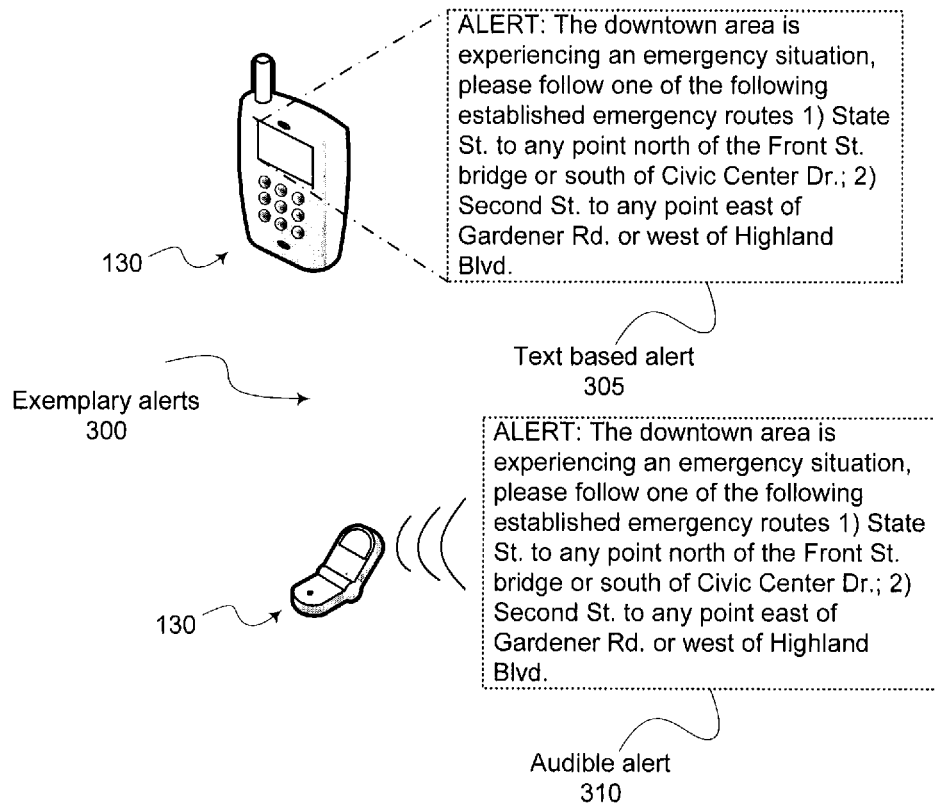
FIG. 3 depicts exemplary alerts provided by the emergency shepherd service.

FIG. 3 illustrates exemplary alert messages 300 that may be presented by the alert module 160. The notification module 155 may provide the contents of the alert messages 300 to the alert module 160 for presentation to the operator of the device 130. As illustrated, the alerts 300 may identify an affected area 140 generally, e.g., the downtown area. In another exemplary approach, the affected area 140 may be specifically defined by coordinates, road boundaries, etc. The alert messages 300 may include directions such as a suggested alternative route away from the affected area 140. In one exemplary approach, the suggested alternative route may be an established emergency route that is not based on the current location of the communication device 130. However, in another exemplary approach, the alternative route may be a customized route away from the affected area 140 that is based on the current location of the communication device 130. For example, the suggested alternative route may provide turn-by-turn directions to avoid or escape the affected area 140.

The content and format of the alert messages 300 may be based on the capabilities of the device. For example, devices 130 capable of displaying text messages may present the user with a text based alert 305. However, devices 130 that only have audio capabilities may present the user with an audio based alert 310. Similarly, devices 130 with video capabilities may present video based alerts (not shown). For devices 130 with graphic or video capabilities, the affected area may be depicted graphically on a map or the like. Similarly, the directions and suggested alternative route could be outlined on a map. Additionally, the format of the message may be based on the preferences of the operator of the device 130. In one exemplary approach, the notification module 155 may instruct the communication device 130 to preempt its normal operation in order to present the message to the operator. For example, the communication device 130 may be commandeered to present the message even if an ongoing phone call needs to be interrupted. The alert module 160 may further be configured to precede an alert message with a distinctive ring, visual pattern, vibration pattern, etc. Accordingly, the notification module 155 and the alert module 160 may cooperate to present alert messages 300 in the most effective manner available to the communication device 130.

Figure 4:
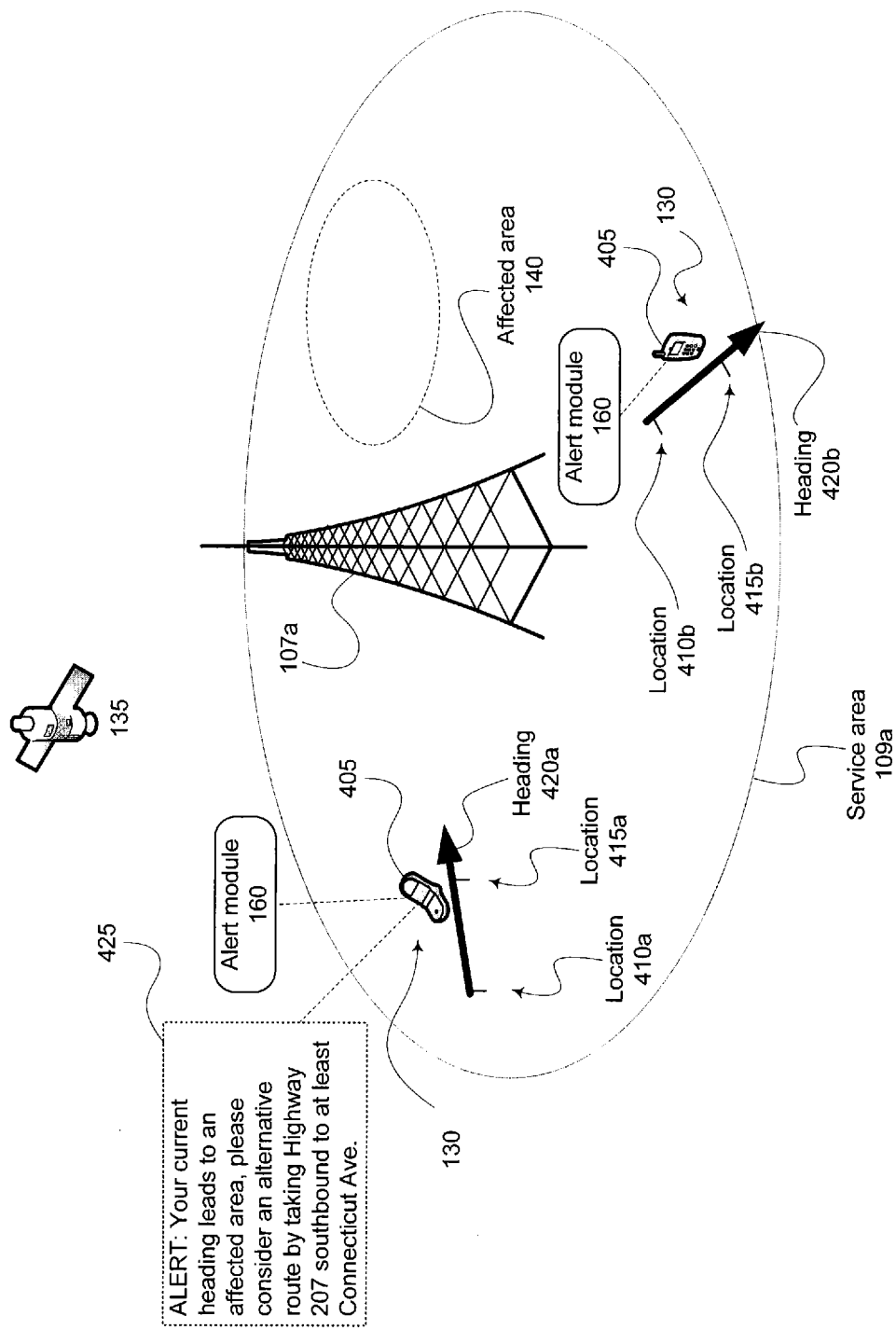
FIG. 4 is a system diagram of an exemplary emergency shepherd service providing heading based alerts to mobile communication devices.

FIG. 4 illustrates the identification of communication devices adjacent to a periphery of an affected area 140. Devices 130 in the periphery of the affected area 140 may be unaffected, but at risk devices 405. As discussed above, the ESS 100 may send messages to communication devices 130 associated with an affected area 140, e.g., those devices within the affected area 140. However, it may also be beneficial to notify the unaffected devices 405 that may be approaching the affected area 140. For example, the presence of people trying to approach the affected area 140 could hamper any attempts at evacuating the affected area. In general, people may want to be informed of the existence of an affected area 140 prior to actually entering the area.

The notification module 155 may review the records of the cell tower controller 110 to identify devices 130 associated with the affected area. In one exemplary approach, the periphery may be defined as the service area 109a or areas that encompass the affected area 140, such that all communication devices 130 in communicative contact with the cell tower 107a are considered to be unaffected, but at risk devices 405. In another exemplary approach, the periphery may be defined by a specific distance from the affected area 140, such that all communication devices 130 in communicative contact with cell towers 107a within the specific distance will be identified as unaffected, but at risk devices 405. Depending on the distance, multiple towers 107a and potentially multiple cell tower controllers 110 (FIG. 1) may need to be contacted to discover unaffected devices 405 adjacent to the periphery of the affected area 140.

Once identified, the notification module may instruct the communication devices 130 to establish their locations 410*a-b*, 415*a-b*. In one exemplary approach, the first location 410*a-b* may have been determined while identifying the device 130 as an unaffected device 405. However, in another exemplary approach, the unaffected device 405 may be instructed to determine its location multiple times subsequent to being identified as an unaffected device 405. Any of the locating techniques discussed above may be applicable. For example, the devices 405 may establish their location 410*a-b*, 415*a-b* via the Global Positioning System (GPS). In another exemplary approach, the locations 410*a-b*, 415*a-b* may be based on the locations of communication facilities 105 and the records of communicative contact therewith.

The locations 410*a-b* may be used to estimate a heading 420*a* of the device 405. The heading in combination with the latest location 410*b* may be used to determine whether the heading leads to the affected area 140. If the heading 420*a* leads to the affected area 140, the device 405 may receive a message including an alternative route 425 away from the affected area 140. However, the device 405 with a heading 420*b* that does not lead to the affected area 140 may not receive a message with an alternative route 425. Accordingly, devices 405 may be targeted with only relevant information, which may be more likely to be acted upon by the operator of the device.

In one exemplary approach, the time difference between the first and second locations 410*a-b* may be used to calculate a vector including the heading 420*a-b* and speed of the device 405. The speed may be used to determine whether the device should be notified about the affected area 140. For example, a slowly moving device 405 may not need to be notified initially due to the possibility that the situation of the affected area 140 may be cleared by the time the device 405 reaches the area. Accordingly, a time threshold may be used to determine whether a device should be notified 405. For example, a device 405 that will reach the affected area 140, based on its current location 415*a*, heading 420*a*, and speed, within a certain time, e.g., 10 minutes, may be notified.

Processors 150, 170 and terminal 185 may be any general purpose computing device, such as a PC, server, or a specialized device. Processors 150, 170 and terminal 185 may have software, such as an operating system in addition to the instructions of modules 155, 175, 190. The operating system may also include a network protocol stack, for establishing network connections, e.g., connections to packet network 125.

Processors 150, 170, terminal 185, and communication devices 130 may employ any of a number of user-level and embedded operating systems known, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., the Apple Mac OS X operating system, the Linux operating system, the Symbian mobile device operating system, the Android mobile stack developed by Google, etc. Computing devices may include any one of a number of computing devices known to those skilled in the art, including, without limitation, a computer workstation, a desktop, notebook, laptop, or handheld computer, mobile phones, smart phones, PDAs, or some other computing device known.

Processors 150, 170, terminal 185, and communication devices 130 may each include instructions executable by one or more processing elements such as those listed above. Computer-executable instructions may be compiled or interpreted from computer programs created using a variety of programming languages and/or technologies known, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, and volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 5:
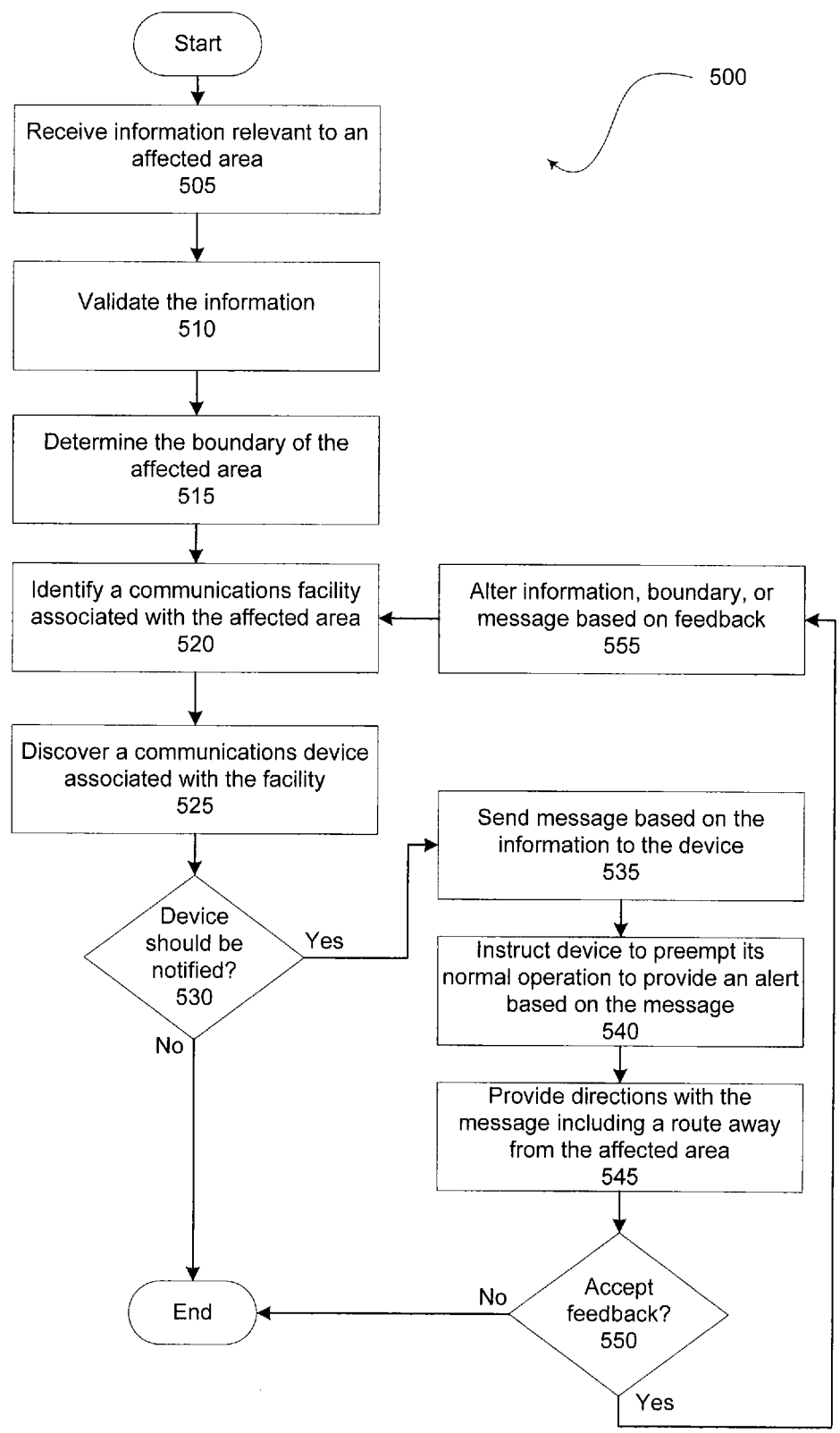
FIG. 5 is a flowchart depicting exemplary steps and decisions related to providing information about an affected area to particular communication devices.

FIG. 5 illustrates a flowchart of an exemplary process 500 for sending messages using the disclosed Emergency Shepherd Services (ESS) 100, 200. The ESS processor 170 may include a computer-readable medium having stored instructions for carrying out certain operations described herein, including some or all of the operations described with respect to process 500. For example, some or all of such instructions may be included in the ESS module 175. Some steps of process 500 may include user input and interactions. However, it is to be understood that fully automated or other types of programmatic techniques may implement steps that include user input.

The process 500 begins in step 505 in which information may be received about an affected area 140. In one exemplary approach, an operator (not show) of the ESS 100 may input information into the ESS module 175 using a computer interface such as a graphical user interface. However, in another exemplary approach, the ESS 100 may additionally receive information from at least one third party. The third party access point 180 may provide an entry module 190 for the entry of information about an affected area 140. The entity operating the third party access point 180 may be in the best position to have the necessary information. For example, a governmental or law enforcement agency may have information about an emergency situation, a weather service may have information about severe weather, a production facility may have information about hazardous material releases, a road commission may have information about traffic conditions, etc. Additionally, the information may be based on sensory input 197 from a sensor 195.

The information that is received may be specific to a particular location. Additionally, information may include first and second information in which the first information is relevant to an affected area 140 while the second information is relevant to only a subset of the affected area. For example, the first information may pertain to an entire affected area 140 while the second information may be relevant to a particular building 210 within the affected area 140. The ESS module 175 may recognize certain information providers as competent to provide information that is relevant to a particular area. In one exemplary approach, the ESS module 175 may additionally request information from a competent information provider based on the existence of communication devices 130 proximate to the location for which the information provider is competent.

Next, in step 510, the information may be validated. In one exemplary approach, the information may be automatically validated based on the identity of the information provider. For example, trusted sources such a law enforcement agencies may be automatically validated. The ESS module 175 may maintain a list of trusted information providers that receive automatic validation. Some information may be validated based on being provided by a competent information provider. Other information providers may need to be validated based on the degree correlation between information provided by other information providers. For example, information may be validated if it is similar to information provided by other information providers. In another exemplary approach, information may be sent to communication devices 130 in the affected area 140 that are operated by trusted individuals, e.g. first responders, for validation.

Next, in step 515, the boundary of the affected area 140 may be determined. In one exemplary approach, the boundary may be provided along with the information such that no changes to the boundary need to be made. However, in other exemplary approaches, the boundary may need to be determined based on the information from one or more information providers. For example, the boundary may be the total area reported by all of the information providers. In another exemplary approach, the intersection of the areas reported by the information providers may be used as the affected area 140. The credibility or competency of a particular information provider may be used as a weight when determining how to aggregate the boundary information provided by the information providers. As will be discussed below in step 555, the boundary may also be altered or adjusted based on feedback from communication devices 130.

Next, in step 520, communication facilities 105 associated with the affected area 140 may be identified. The affected area 140 may partially or fully overlap the service areas 109*a-c* of multiple cell towers 107*a-c*, which may be associated with different cell tower controllers 110. The operator of the network 102 typically tracks and records the geographic positions of the communication facilities 105 along with boundaries of any applicable service areas, e.g., 109*a-c*. The identification of affected communication facilities 105, which are associated with the affected area 140, may be based on a correlation or overlap between the affected area 140 and the geographic positions of the communication facilities 105. Accordingly, the affected communication facilities 105 may be any communication facility that provides communication services to at least a subset of the affected area 140.

Next, in step 525, communication devices 130 associated with the affected communication facilities 105 may be discovered. The devices 130 that might need to be notified may be discovered from the records of contact with the affected communication facilities 105 that were identified in step 520. For example, the records may be searched for all of the devices that contacted a communication facility 105 within a certain time frame, e.g., the last ten minutes. This set of devices 130 that might need to be contacted may be reduced to the set of devices that should be contacted based on at least the location of each device 130 with respect to the affected area 140.

Next, in step 530, it may be determined whether the communication device 130 should be notified. While the particularities of this determination will be discussed below with respect to FIG. 6, the determination may be based on the location of the device in association with the affected area 140. For example, in addition to notifying devices 130 within the affected area 140, devices 130 near the affected area 140 such as adjacent to a periphery of the affected area 140 may also be notified. Similarly, devices 130 outside the affected area 140 but heading thereto may also be notified.

If there are no devices 130 to notify, the process 500 may end. However, if there are devices 130 to be notified, a message based on the information provided in step 505 may be sent to the devices 130 in step 535. The ESS module 175 may instruct the notification module 155 to send the message. If the affected area 140 encompasses at least a subset of service areas 109*a-c* of cell towers 107*a-c* associated with more than one cell tower controller 110, then the ESS module 175 may need to communicate with multiple notification modules 155 at the respective cell tower controllers 110.

Next, in step 540, the devices 130 may be instructed to preempt their normal operation to present an alert based on the message. In one exemplary approach, the alert module 160 may be configured to interrupt ongoing phone calls in order to present the message. In another exemplary approach, the alert module 160 may be able to revive a device from a low power or stand-by mode even if the device is not designed to receive incoming calls in such a mode.

Next, in step 545, directions may be provided with the message. In one exemplary approach, generic directions, e.g., a designated emergency route, may be provided to all of the devices 130. However, in another exemplary approach, the directions may be particular to the affected area 140 or the location of the device 130. For example, the location of the device 130 may be used as a starting point for a route that leads away from the affected area 140. The directions may include turn-by-turn directions and may further be provided in a graphical form such as a map depending on the capabilities of the device 130.

Next, in step 550, feedback may be accepted. In some exemplary approaches, the ESS 100 may take advantage of the bi-directional communication capabilities of the devices 130 in order to accepted feedback about the affected area 140. However, if feedback is not accepted, the process 500 may end. For example, feedback might not be accepted if it is deemed that the information from the devices 130 is not reliable or trustworthy. Some implementations may limit feedback to only authorized devices, e.g., devices assigned to law enforcement or other types of first responders. In one exemplary approach, the alert module 160 may provide an interface for an operator to provide input and feedback about the affected area 140. For example, the operator may be asked whether he/she is experiencing the conditions of the affected area 140, whether the conditions are worse, better, or consistent with the message, whether the suggested directions are passable and not blocked, etc.

In step 555 and following the receipt of any feedback, the information, boundary, or message may be altered based on the feedback. Feedback may be weighted and aggregated prior to any alterations. In one exemplary approach, feedback from operators indicating that the conditions of the affected area 140 are better than reported in the message may indicate that the boundary of the affected area 140 is inaccurate and should to be reduced. Feedback indicating that the suggested route is not passable may result in calculation of one or more alternative routes. Subsequent to any alterations, the process may return to step 520 to re-identify the communication facilities associated with the affected area 140.

Following a determination in step 530 that the device 130 should not be notified and a determination in step 550 that feedback is not accepted process 500 may end.

Figure 6:
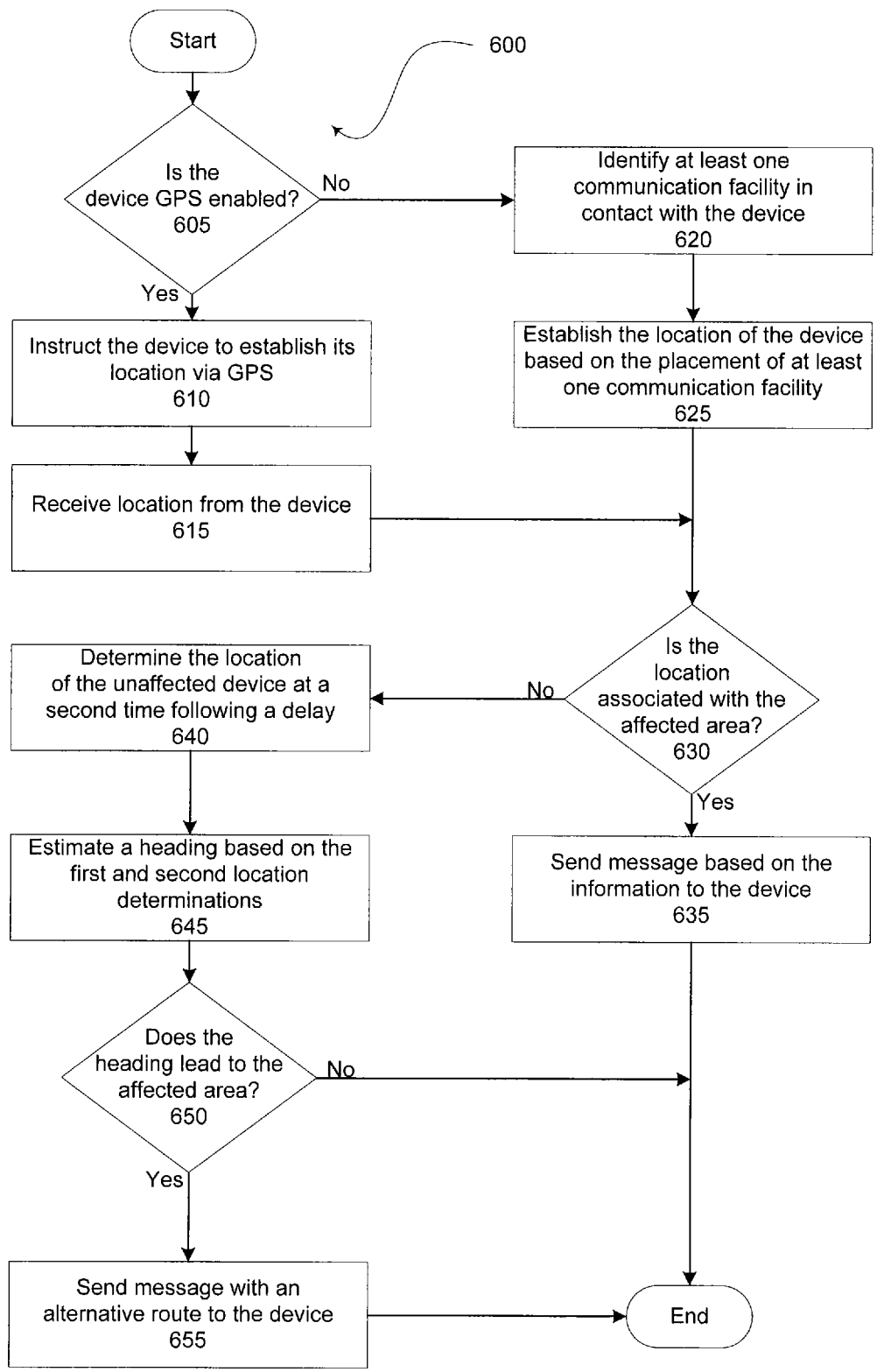
FIG. 6 is a flowchart depicting exemplary steps and decisions related to determining which communication devices should receive information about an affected area.

FIG. 6 illustrates a flowchart of an exemplary process 600 for determining whether communication devices 130 should be notified about an affected area 140. The steps and decisions of process 600 may be part of the determination of step 530 of process 500. The notification processor 150 and the ESS processor 170 may include computer-readable medium having stored instructions for carrying out certain operations described herein, including some or all of the operations described with respect to process 600. For example, some or all of such instructions may be included in the notification module 155 and the ESS module 175. Some steps of process 600 may include user input and interactions. However, it is to be understood that fully automated or other types of programmatic techniques may implement steps that include user input.

Process 600 begins in step 605 when it is determined whether the communication device 130 is capable of determining its location via a satellite navigation system. For example, the device may be GPS enabled. In one exemplary approach, the device 130 will be contacted via the communications network 102 to inquire whether the device is GPS enabled. In another exemplary approach, the communications network 102 may include searchable records of the capabilities of the devices 130, which may be queried to determine if the device 130 is GPS enabled. If the device is not GPS enabled, then the process 600 may skip to step 620.

In step 610, the device may be instructed to establish its location via the GPS. In one exemplary approach, this instruction may be combined with the inquiry of step 605. In another exemplary approach, the instruction of step 610 may be part of a separate communication between the communications network 102 and the device 130. The instructions may cause the device 130 to enable its GPS receiver, which typically maintains a stand-by or power saving state. The receiver may then receive signals from a plurality of navigation satellites 135. The time and ephemeris data contained in the signals may be used to calculate the location of the device 130.

Next, in step 615, the location that was established by the device may be received. For example, the device 130 may transmit the established location to the cell tower controller 110.

In step 620, a device 130 that is not GPS enabled may be located using the records of communicative contact between the device and at least one communication facility 105. For example, the cell tower controller 110 may maintain records of all contacts with communication devices 130. These records may be stored locally with the cell tower controller 110 and may also be aggregated by the operator of the communication network 102 with the records from other cell tower controllers 110. As discussed above, the records may include a unique identifier for each communication device 130 as well as attributes related to the contact between devices and communication facilities 105, e.g., cell towers 107*a-c*. Accordingly, the records may be searched to identify at least on communication facility 105 in communicative contact with the device 130. The accuracy of the determination of the location may vary with the number of communication facilities 105 in contact with the device 130. For example, when in contact with only a single cell tower 107*a*, the location of the device 130 may be approximated to be anywhere within the service area 109*a*. However, when in contact with multiple communication facilities, a significantly more accurate location may be calculated.

Next, in step 625, the location of the communication device may be estimated based on location of communication facilities 105 identified in step 620. The records of contact between the facilities 105 and devices 130 may include values related to the signals received from the communication devices such as the time of arrival, the difference between the time the signal was sent and the time of arrival, the angle of arrival, etc. As discussed above, these values may be used in combination with the known locations or placements of the communication facilities 105 using locating techniques such as triangulation, trilateration, multilateration, etc. to establish the location of the communication device 130.

Next, in step 630, it may be determined whether the location of the device 130 is associated with an affected area 140. As discussed above, the affected area may be identified in information received by the ESS module 175. Additionally, the ESS module 175 may alter the boundary of the affected area 140 based on additional information from other information providers as well as from feedback provided by communication devices 130. Once the boundary of the affected area 140 is set, geometric calculations, and the like, may be used to determine if the location is associated with the area. In one exemplary approach, the association may be based on the location being within the boundary of the affected area 140. In another exemplary approach, the association may be based on the location being within a specified distance outside of the boundary. In another exemplary approach, any communication device 130 in a service area 109*a-c* that includes at least a subset of the affected area 140 may be considered associated therewith.

In step 635, a message based on information about the affected area 140 may be sent to the device 130 if the location of the device is associated with the affected area. The communication device 130 may include a notification module 160 configured to provide a message 300 based on the capabilities of the device as well as based on the preferences of the operator. For example, the device 130 may be able to provide audible messages 310, textual messages 305, and even graphical or video based messages (not shown).

In step 640, the location of the device may be determined a second time if the first location of the device was not determined to be associated with the affected area in step 630. The process of determining the location for a second time may follow the same process discussed above in steps 610, 615, 620, and 625.

Next, in step 650, it may be determined whether the heading 420*a* leads to the affected area 140. The first and second locations 410*a*, 415*a* may be used as two points to calculate a directed line or heading 420*a*. Geometric calculations, and the like, may be used to calculate whether the line intersects with the affected area 140. In one exemplary approach, the boundary of the affected area 140 may be expanded by a predetermined amount such that more devices 130 may be notified about the affected area 140. The time and distance differences between the locations 410*a*, 415*a* may be used to calculate the speed of the device 130. The speed may be used to further determine whether the device 130 should be notified. In one exemplary approach, the device 130 may only be notified if it is within a certain time, e.g., 5 minutes, of reaching the affected area 140. The heading and speed of the device 130 may be continuously recalculated given the possibility that the device may not be traveling at a consistent speed in a consistent direction.

In step 655, a message with an alternative route may be sent to the device. Step 655 may be similar to step 635 except that the type of directions provided with the message may differ. For example, the directions included with the message may include directions around the affected area 140 rather than just away from the affected area. The current location 415*a* and heading 420*a* of the device 130 may be used when determining the alternative route.

Following steps 655 and 635, as well as a determination that the device 130 is not heading to the affected area 140, process 600 may end.

Accordingly, exemplary Emergency Shepherd Services 100, 200 have been described. Each service 100, 200 may augment an existing communications network 102, 205 to notify communication devices 130 about an affected area 140. The services 100, 200 may notify only those devices 130 that are proximate to the affected area 140 or are heading toward the affected area 140. GPS and communication facility 105 based locating techniques may be used to determine the location of communication devices 130. Third parties such as governmental entities, public safety agencies, facility managers, etc. may provide information about an affected area 140 to the services 100, 200. Information about an affected area 140 may be based on sensory input 197 from sensors 195. Information from multiple information providers may be targeted to a specific location and aggregated to provide notifications to the communication devices 130 that include information from the providers that are most knowledgeable about the current location of a particular device. Communication devices 130 may also provide feedback to the services 100, 200 about the affected area 140, which may be used to alter the boundary and future notifications related to the affected area.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, it is to be understood that the above description is intended to be illustrative and not restrictive. Many systems and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites explicitly to the contrary.

What is claimed is:

1. A method, comprising:
    receiving area data related to an affected area from at least one information provider through a third party access point;
    determining a boundary associated with the affected area based on the area data;
    discovering at least one communication device outside the boundary of the affected area;
    determining whether the communication device is heading toward the affected area based on:
        establishing, when the communication device is associated with one or more communication facilities, an approximate location of the communication device at a plurality of time periods based on a respective placement of each of the one or more communications facilities;
        establishing a positional heading based on the approximate locations; and
        determining that the communication device is heading toward the affected area based on the positional heading of the communication device;
    if the communication device is heading toward the affected area, sending a message including at least one route to avoid the affected area based on the area data to the communication device;
    receiving second area data related to the affected area from a particular provider, wherein the second area data is weighted for its reliability;
    determining whether the particular provider is competent based on the weighted reliability of the second area data;
    determining a provider location of the particular provider when the particular provider is determined as competent; and
    requesting additional area data from the particular provider when the at least one communication devices is associated with the provider location.

2. The method of claim 1, wherein determining whether the communication device is heading toward the affected area comprises:
    instructing the communication device regarding establishing its location at a plurality of time periods via a satellite based positioning system;
    receiving the locations from the communication device;
    establishing the positional heading based on the locations; and
    determining that the communication device is heading toward the affected area based on the positional heading of the communication device.

3. The method of claim 1, further comprising receiving, by the notification subsystem, additional area data from a plurality of information providers, wherein the additional area data is weighted for its reliability.

4. The method of claim 3, wherein the boundary is further determined based on the additional area data if the additional area data is deemed reliable.

5. The method of claim 1, further comprising selectively providing the area data including sensory input acquired by at least one emergency sensor regarding the affected area to the notification subsystem.

6. The method of claim 5, wherein the sensor input includes aggregating multiple sensor inputs from a plurality of sensors.

7. The method of claim 5, wherein the at least one emergency sensor is the communication device.

8. The method of claim 5, wherein the at least one emergency sensor is a third party access point.

9. The method of claim 1, wherein the area data is supplied by a controller in the affected area, the area data including a predetermined amount of dropped signals from the communication devices within the affected area.

10. The method of claim 1, wherein the boundary is determined based on an increase in call volume to an emergency response number within a geographic area.

11. The method of claim 1, further comprising:
    providing a targeted message to the at least one communication devices that is associated with a provider location based on the additional area.

12. A system, comprising:
    at least one communications facility configured to provide communication services to a plurality of communication devices; and
    a notification subsystem including at least one processor and a computer readable medium having instructions configured to cause the processor to:
        receive area data related to an affected area from at least one information provider through a third party access point;
        determine a boundary of the affected area based on the area data;
        discover that at least one communication device of the plurality of communication devices is outside the boundary of the affected area and heading toward the affected area based on:
            establishing, when the communication device is associated with one or more communication facilities, an approximate location of the communication device at a plurality of time periods based on a respective placement of each of the one or more communications facilities;
            establishing a positional heading based on the approximate locations; and
            determining that the communication device is heading toward the affected area based on the positional heading of the communication device;

send a message including at least one route to avoid the affected area based on the area data to the communication device;
receive second area data related to the affected area from a particular provider, wherein the second area data is weighted for its reliability;
determine whether the particular provider is competent based on the weighted reliability of the second area data;
determine a provider location of the particular provider when the particular provider is determined as competent; and
request additional area data from the particular provider when the at least one communication devices is associated with the provider location.

13. The system of claim 12, further comprising at least one emergency sensor configured to selectively provide the area data including sensory input acquired by the at least one emergency sensor regarding the boundary associated with the affected area to the notification subsystem.

14. A method, comprising:
maintaining geographic positions of a plurality of communication facilities;
receiving area data related to an affected area from at least one information provider through a third party access point;
determining a boundary of the affected area based on the area data;
correlating the affected area with the positions to identify at least one affected communication facility that provides communication services to at least a portion outside of the boundary of the affected area;
discovering at least one communication device associated with the affected communication facility and outside the boundary of the affected area;
determining whether the communication device is heading toward the affected area based on:
  establishing, when the communication device is associated with one or more communication facilities, an approximate location of the communication device at a plurality of time periods based on a respective placement of each of the one or more communications facilities;
  establishing a positional heading based on the approximate locations; and
  determining that the communication device is heading toward the affected area based on the positional heading of the communication device;
if the communication device is heading toward the affected area, commandeering the communication device to provide an alert message including at least one route to avoid the affected area based on the area data;
receive second area data related to the affected area from a particular provider, wherein the second area data is weighted for its reliability;
determine whether the particular provider is competent based on the weighted reliability of the second area data;
determine a provider location of the particular provider when the particular provider is determined as competent; and
request additional area data from the particular provider when the at least one communication devices is associated with the provider location.

15. The method of claim 14, further comprising:
including, by the notification subsystem, placement details for the communication facilities with the positions, wherein each placement detail includes a placement location of a respective communication facility within a containing structure; and
providing, by the notification subsystem, structural details of the structure with the alert message.

16. The method of claim 14, further comprising altering, by the notification subsystem, at least one of the area data, the boundary, and the alert message based on feedback from the communication device.

17. A method, comprising:
receiving area data related to an affected area from at least one information provider through a third party access point;
determining a boundary associated with the affected area based on the area data;
discovering at least one communication device outside the boundary of the affected area;
determining whether the communication device is heading toward the affected area;
if the communication device is heading toward the affected area, sending a message including at least one route to avoid the affected area based on the area data to the communication device,
wherein determining whether the communication device is heading toward the affected area includes:
  calculating a directed line based on first and second locations of the communication device,
  calculating whether the directed line intersects with the boundary of the affected area,
  determining time and distance differences between the first and second locations to calculate a speed of the communication device, and
utilizing the speed to further determine whether the message should be sent;
continuously recalculating the heading and the speed of the communication device to determine whether the communication device is traveling at a consistent speed in a consistent direction, and
utilizing the recalculated headings and the speeds to further determine whether the message should be sent.

18. The method of claim 17, wherein utilizing the speed to further determine whether the message should be sent includes:
sending the message if the communication device will intersect the boundary of the affected area within a certain time.

* * * * *